2,811,449

PROCESS FOR THE CLARIFICATION OF VEGETABLE BEVERAGES

Daniel B. Witwer, Montclair, N. J., and Joseph M. Wilkinson, Easton, Pa., assignors to General Aniline & Film Corporation, New York, N. Y., a corporation of Delaware No Drawing. Application December 30, 1954, Serial No. 478,872

11 Claims. (Cl. 99—48)

This invention relates to an improved process for clarifying and stabilizing vegetable beverages, such as beer, wine, and fruit juices, against precipitation caused by presence therein of tannic acid or tannins, or by protein-tannin complexes.

As disclosed in United States Patent 2,688,550, vegetable beverages of the aforesaid type are subject to the formation of haze or turbidity when stored for longer periods at low temperatures. In beer, this is apparently caused by precipitation of protein-tannin complexes, and in wine and fruit juices, by tannic acid or tannins. Such turbidity is commonly called "chill haze."

According to the aforesaid patent, addition of ½ to 2 lbs. of polyvinylpyrrolidone to each 100 barrels (i. e. about 25,000 lbs.) of beer effects precipitation of protein-tannin complexes, so that after removal of the resulting precipitate, e. g., by centrifuging or filtering, the tendency of the beer to form chill haze is eliminated, and the flavor and the foaming characteristics improved. It was also disclosed that addition to wines or fruit juices of an amount of polyvinylpyrrolidone about equal to the amount of tannic acid present, precipitated the latter and similarly eliminated chill haze tendencies in the resulting beverage.

According to our copending application bearing Serial No. 448,127, filed August 5, 1954, it was found that tannic acid is substantially completely precipitated from aqueous solution by about 2⅓ times its weight of polyvinylpyrrolidone, with formation of a complex addition product containing substantially all of the polyvinylpyrrolidone, when added in the aforesaid proportions.

In the case of beer, however, it was found that precipitation of the protein-tannin complex by addition of polyvinylpyrrolidone first increased with increasing amounts of polyvinylpyrrolidone, but then, after reaching a maximum, the amount of precipitate decreased when larger amounts of polyvinylpyrrolidone were added, so that finally no precipitation occurred at all.

In one case, for example, it was found that the precipitate produced from beer undergoing test attained its maximum amount upon addition of 1 to 1½ lbs. of polyvinylpyrrolidone per 100 barrels, but on adding increased amounts of polyvinylpyrrolidone, the amount of precipitate was reduced until on addition of 4 lbs. of polyvinylpyrrolidone per 100 barrels, no precipitate was formed. This effect is evidently due to the peptizing effect of excess polyvinylpyrrolidone on the tannin complexes normally precipitated. Thus, in order to remove the chill haze-producing protein-tannin complexes from beer with polyvinylpyrrolidone, careful adjustment of the amount of precipitant is necessary.

It has also been found that separation of the precipitate produced with polyvinylpyrrolidone in beer cannot be carried out conveniently by settling and decantation, but in practice, requires filtration or centrifuging for its removal.

We have discovered that water-soluble copolymers of N-vinyl pyrrolidone with vinyl esters of lower aliphatic monobasic carboxy acids, especially with vinyl acetate, are not only adapted to precipitate chill haze-producing tannins and tannin-like compounds of vegetable beverages, such as beer, but that such copolymers have a number of significant and unexpected advantages over polyvinylpyrrolidone as a precipitant for these substances. Thus, we have found that the copolymers of our invention, when used in excess of the amount required to produce optimum precipitation of the tannin-like components of vegetable beverages, does not cause a decrease in the amount of precipitate due to any peptizing effect of the copolymer. Moreover, the amount of precipitate formed in beverages, by addition of the copolymers of this invention, is considerably greater than that produced with an optimum amount of polyvinylpyrrolidone, and the nature of the precipitate produced, e. g., by addition of our copolymers to beer, is such that it settles readily and permits separation thereof from the clear liquid by decantation. The consequent elimination of a filtering operation results in a substantial economy of effort, equipment and costs.

We have found that water soluble copolymers of vinyl acetate with N-vinyl pyrrolidone in which the weight proportions of these respective monomer constituents range from 1:1 to 1:10, are effective to precipitate tannin complexes, tannins and tannic acid from vegetable beverages. The preferred ratios of the aforesaid monomeric components are from 1:1.5 to 1:3. It has been further found that copolymers of the aforesaid type, having a "K-value" in water of 25 to 50 and especially of 30 to 40, are the most effective.

"K-value" is an additive measure of the relative thickening power of a polymer, and can be defined in terms of the concentration and relative viscosity of a polymer in any given solvent. Relative viscosity is the quotient of the time required for draining a solution of the polymer in the selected solvent having a concentration of 1 gram per ml. through a given orifice, divided by the time required for draining of a similar volume of the solvent through the same orifice. K value can be defined by the following equations:

$G = \log_{10}$ (relative viscosity)
$C =$ polymer concentration in grams/100 ml.

$$K \text{ value} = \frac{3G - 2 + \sqrt{9G^2 + 12G + \frac{1200G}{C} + 4}}{0.006(50 + C)}$$

K value is also a direct function of the molecular weight of the polymer. Thus, molecular weight can be calculated as a simple exponential function of "intrinsic viscosity." The latter can be defined in terms of K value by the expression:

$$2.303 \ (0.001 \ K + 0.000075 \ K^2)$$

Instead of vinyl acetate, vinyl esters of other lower (i. e. containing up to 4 carbon atoms) monobasic carboxy acids can be used as the copolymer constituents, e. g., vinyl butyrate, vinyl propionate. The polymerizable monomer constituents of the copolymers employed preferably consist of N-vinyl pyrrolidone and the aforesaid vinyl esters, exclusively, or substantially; i. e. if additional copolymerized constituents are included, they should not exceed 10% of the amount of the aforesaid vinyl ester constituents.

The method of using the N-vinyl pyrrolidone copolymers in accordance with this invention for clarifying vegetable beverages comprises addition of the copolymer to the liquid containing tannin, tannic acid or protein-tannin complex, thoroughly distributing the copolymer therein (advantageously by use of a proportioning device for its addition), and allowing the resulting liquid to stand, preferably at low temperature (i. e. 32° to 70° F.) for sufficient time to permit formation, flocculation and settling of the resulting precipitate.

In beer, the amount of copolymer generally required may vary, depending on the tannin complex content of the beer, from ½ to 4 lbs. per 100 barrels (i. e. per 25,000 lbs.). In the case of beverages containing tannin or tannic acid, 1 to 3 lbs. of copolymer per lb. of tannic acid or equivalent tannin, is usually sufficient. Addition of amounts in excess of the amount required for optimum precipitation (e. g. up to 100% excess) do not, in contrast with polyvinylpyrrolidone, interfere with precipitation or diminish the amount of precipitate. Hence, no difficulties are encountered from addition of a moderate excess of the copolymer over the amount required to yield maximum precipitation. The liquid is preferably allowed to stand at low temperature (e. g. 32°–40° F.) for some time (one or more days) to permit settling of the precipitate which is formed. The beer can then be readily separated by decanting from the precipitate. Alternatively a filter or centrifuge, can be used. It has been found that the precipitate permits rapid filtration. The N-vinyl pyrrolidone-vinyl ester copolymer can be added advantageously to the beer at the time of racking down from the fermenters to ruh storage, or upon transferring the beer to finishing storage. In either case, the beer can be separated by decantation from the resulting precipitate.

The process of our invention as illustrated by the following examples, wherein parts are by weight unless otherwise indicated.

*Example I*

A copolymer of N-vinyl pyrrolidone with vinyl acetate, wherein the proportion respectively of the aforesaid monomer constituents was 68:32, was added in amounts corresponding to ¼ to 1½ lbs. per 100 barrels, to a series of samples of filtered lager beer from the finishing cellar, not previously subjected to any chill haze-preventing treatment. The beer samples were allowed to stand for 5 days at 35° F. During this time a precipitate was formed which settled readily, and at the end of the period, the beer was readily separated from the precipitate by decantation. The precipitates formed in the series of samples were dried and weighed, the results being as follows:

| Copolymer Added, Lbs. per 100 Barrels | Mg./3 Gal. | Mg. Precipitate from 3 Gal. |
| --- | --- | --- |
| ¼ | 136 | 171 |
| ½ | 272 | 295 |
| ¾ | 409 | 399 |
| 1 | 545 | 485 |
| 1½ | 817 | 550 |

From the foregoing, it appears that the amount of precipitate increased at a fairly uniform and rapid rate upon adding up to ¾ lb. of copolymer per 100 barrels of beer. Upon addition of ¾ to 1½ lb. of the copolymer the rate increase was relatively small. The samples of beer decanted from the precipitate were subjected to a chill haze test involving freezing followed by thawing. The samples treated at the rate of ¾ lb. of copolymer or more per 100 barrels showed no haze or turbidity in the test.

For purposes of comparison, another sample of the same beer was similarly treated with polyvinylpyrrolidone at the rate of 1 lb. per 100 barrels (found to be the optimum for polyvinylpyrrolidone treatment of the batch in question). The precipitate recovered on centrifuging the sample amounted to only 134 ml. for 3 gals., i. e., scarcely more than ¼ of the amount obtained with the aforesaid vinyl acetate copolymer of N-vinyl pyrrolidone.

*Example II*

A portion of malt ale from the finishing cellar was treated with a copolymer similar to that of Example I, in an amount corresponding to 1 pound per 100 barrels. The beer was then held at 40° F. for two days. The precipitate which formed was allowed to settle, and the liquid decanted therefrom. The precipitate was dried and weighed, and found to amount to about 1 lb. per 100 barrels. The control sample, to which no precipitant had been added, remained clear while standing at the aforesaid temperature for the same two-day period. The clarified ale and the control sample were then frozen and thawed. The clarified ale sample, which had been treated with the aforesaid copolymer, remained clear upon thawing, while the control sample exhibited a pronounced chill haze. Similar use of polyvinylpyrrolidone to clarify another sample of the same batch of ale also yielded a product exhibiting no chill haze after freezing and thawing, but the precipitate required removal by centrifuging, and when dried, amounted to only ⅛ lb. per 100 barrels.

*Example III*

Three samples of unfiltered lager beer, upon racking down from the fermenters to ruh storage, were separated from the main batch. The first sample was treated with a copolymer of N-vinyl pyrrolidone and vinyl acetate, wherein the ratio of these constituents was 68:32. The second sample was treated with a copolymer of the same type in which the ratio of the said constituents was 62:38. In each case, the K value of the copolymer was 33. The copolymers were each added to the samples in a quantity corresponding to 1 lb. per 100 barrels, or 545 mg. per 3 gallons. A third sample was left untreated as a control. After holding the three samples for two weeks at 35° F., the precipitate formed in each of the samples was measured. It was found that the dry weight of the precipitate from the samples treated with the copolymers were respectively 6.30 and 6.67 grams per 3 gallons, while the control sample correspondingly yielded 5.32 grams. The beer treated with the copolymers showed no chill haze during further processing.

Similar tests were made, employing copolymers containing vinyl acetate and N-vinyl pyrrolidone in the following weight ratios, and having the K values indicated below:

| Ratio of Vinyl Acetate to N-Vinyl pyrrolidone | K Value |
| --- | --- |
| 9:91 | 22 (in water). |
| 21:79 | 19 (in water). |
| 31:69 | 20 (in water). |
| 40:60 | 19 (in water). |
| 59:41 | 26 (in butanone). |
| 66:34 | 31.3 (in butanone). |
| 74:26 | 37 (in butanone). |

Of the foregoing, the last three copolymers were found ineffective, apparently, in view of their insolubility in water. All of the others yielded appreciable amounts of precipitate from beer, when added in an amount corresponding to 1 lb. per 100 barrels, and substantially improved the chill haze resistance of the products.

*Example IV*

An aqueous solution of tannic acid, buffered to pH 4.2, was treated with varying amounts of a copolymer similar to that of Example I. The amount of tannic acid precipitated was determined by colorimetry, using $FeCl_3 \cdot K_3Fe(CN)_6$ reagent as the color former. The quantities of tannic acid and copolymer employed were such that the medium in which precipitation occurred contained 5 mg. of tannic acid in each 10 ml. The amounts of copolymer added ranged up to 15 mg. It was found that the percent of tannic acid precipitated increased rapidly, to the point where about 80 percent thereof had been removed from solution. The amount of copolymer added at this point was about 8 mg. Addition of further amounts of copolymer, up to 16 mg., effected no substantial further precipitation and no decrease in the amount of precipitate occurred. In a control experiment, polyvinylpyrrolidone was added in a similar manner to solutions of tannic acid. The amount of precipitate formed increased rapidly to a point where about 75 percent of the tannic acid was precipitated. At this point, about 8 mg. of polyvinylpyrrolidone had been added. However, upon addition of increased amounts of polyvinylpyrrolidone, ranging from 9 to 15 mg., the quantity of precipitate decreased, and above 15 mg. no precipitate was recovered.

The copolymers employed in accordance with this invention can be prepared by admixture of the monomers to be copolymerized, dissolved in a common solvent such as butanone, in the proportions in which they are desired in the copolymer, adding a free radical-liberating polymerization catalyst, heating (e. g. at 75° C.) until polymerization is complete, and removing the solvent by distillation at reduced pressure.

Copolymers employed in accordance with this invention are non-toxic, and offer a highly effective and economical means for removing tannins, tannic acid and protein-tannin complexes especially those producing chill haze characteristics from vegetable beverages, especially from beer, and also fruit juices, wines, and the like.

The treatment can be combined, if desired, with other chill haze-reducing treatments. Thus, beer which has been treated in known manner with proteolytic enzymes adapted to destroy the protein content of protein-tannin complexes, can be subsequently treated with a vinyl ester-N-vinyl pyrrolidone copolymer in accordance with this invention. While enzymes of the aforesaid type, which attack the protein component of the chill haze-producing tannin complexes, are temporarily effective, the tannins liberated by their action apparently recombine slowly with proteins remaining in the beer, and after a time, chill haze formation reappears. Treatment with copolymers in accordance with this invention avoids such reappearance of chill haze-forming tendencies.

Variations and modifications can be made in the foregoing examples and procedures, without departing from the spirit and scope of this invention.

We claim:

1. The process for removing tannins, tannic acid and protein-tannin complexes from vegetable beverages, which comprises adding to the beverage containing at least one of the aforesaid compounds, a water-soluble copolymer substantially consisting of N-vinyl pyrrolidone copolymerized with a vinyl ester of a monobasic aliphatic carboxylic acid having up to 4 carbon atoms, and separating the resulting precipitate from the beverage.

2. A process as defined in claim 1, wherein said copolymer consists of N-vinyl pyrrolidone copolymerized with vinyl acetate.

3. A process as defined in claim 1, wherein the weight ratio of said vinyl ester to N-vinyl pyrrolidone, copolymerized therewith in said copolymer, ranges from 1:1 to 1:10.

4. A process as defined in claim 1, wherein the K value of said copolymer is within the range of 25 to 50.

5. A process as defined in claim 2 wherein the weight ratio of vinyl acetate to N-vinyl pyrrolidone copolymerized therewith in said copolymer ranges from 1:1 to 1:10 and the K value of the copolymer is within the range of 25 to 50.

6. A process as defined in claim 2, wherein the weight ratio of vinyl acetate to N-vinyl pyrrolidone copolymerized therewith in said copolymer ranges from 1:1.5 to 1:3, and the K value is within the range of 30 to 40.

7. A process as defined in claim 1, wherein said beverage contains tannic acid and tannins, and the amount of copolymer added to the beverage is 1 to 3 times the weight of tannic acid and tannic acid equivalent contained in the tannins.

8. A process for removing chill haze-producing components from beer, which comprises adding thereto a water-soluble copolymer, consisting substantially of N-vinyl pyrrolidone copolymerized with a vinyl ester of a monobasic aliphatic carboxylic acid having up to 4 carbon atoms, the amount of said copolymer corresponding to ½ to 4 lbs. per 100 barrels of beer, and separating the resulting precipitate from the accompanying liquid.

9. A process defined in claim 8, wherein said copolymer consists of vinyl acetate copolymerized with N-vinyl pyrrolidone in a weight ratio within the range of 1:1 to 1:10.

10. A process as defined in claim 9, wherein the K value of the added polymer is 25 to 50.

11. A process as defined in claim 10, wherein the weight ratio of vinyl acetate to N-vinyl pyrrolidone, copolymerized therewith in said copolymer, is within the range of 1:1.5 to 1:3 and the K value of the polymer is within the range of 30 to 40.

References Cited in the file of this patent

UNITED STATES PATENTS

| | | |
|---|---|---|
| 2,497,705 | Werntz | Feb. 14, 1950 |
| 2,667,473 | Morner et al. | Jan. 26, 1954 |
| 2,688,550 | McFarlane | Sept. 7, 1954 |